Feb. 28, 1967 K. HANA ETAL 3,306,096
METHOD FOR AUTOMATIC SIGNALING AND MONITORING OF SUPERVISED
AND EVALUATED CHEMICAL ANALYSES
Filed Oct. 11, 1965 5 Sheets-Sheet 4

INVENTORS.
KAREL HANA
KAREL PIETSCH
BY ROMAN CERMAK

ATTORNEY.

United States Patent Office 3,306,096
Patented Feb. 28, 1967

---

3,306,096
METHOD FOR AUTOMATIC SIGNALLING AND MONITORING OF SUPERVISED AND EVALUATED CHEMICAL ANALYSES
Karel Hána, Brno, and Karel Pietsch and Roman Cermak, Prague, Czechoslovakia, assignors to Ceskoslovenska Akademie ved, Prague, Czechoslovakia, a corporation of Czechoslovakia
Filed Oct. 11, 1965, Ser. No. 494,780
3 Claims. (Cl. 73—23.1)

This application is a continuation-in-part of our co-pending application Serial No. 187,285, filed April 13, 1962, now abandoned, for which the priority of April 17, 1961 of our Czechoslovak application No. 2,347/61 has been claimed.

The present invention relates to a method of, and device for regulating a chemical production process by analysis.

Analytical instruments working on the principle of gas chromatography are being widely used for the analytical check-up of various chemical production processes, such as production of oxygen, urea, petrol (gasoline), olegine, synthetic rubber, in medicine and the like. Such instruments enable automatization of the production.

Gas chromatography is based on a method utilizing the different sorption of the analyzed sample on a sorbent, the transportation of the sample through the sorbent being effected by a carried gas. It is an analytical method enabling the various components of the analyzed mixture to be separated and their concentration to be determined. The analysis results in voltages variable as to time and having the shape of curves. Their area, or height, correspond to the quantity of the component and the distance of the maximum from the beginning represents an indication relating to quality.

Heretofore used instruments of this type show a common feature in that the recording or evaluating portion is active during an exactly defined interval only, when the component to be followed is expected to appear. This time interval is constant for the entire period of operation of the instrument and has to be adjusted prior to setting the apparaus in operation. It is further necessary to determine in advance the height or area corresponding to the required quantities of the substance followed.

It is apparent from the foregoing that the principle used in the design of heretofore employed instruments is disadvantageous in that the instruments cannot be adapted to any changes in conditions prevailing during the operation of the instrument such as changes of barometric pressure, of the through-flow of the carrier gas, of the time after which the followed component appears on the column outlet. Consequently the chromatograph is bound to effect an incorrect regulation of the apparatus.

It has further to be noted that the fixed interval during which the evaluation device is attached to the chromatograph, need not necessaritly correspond to the moment when the maximum of the followed curve passes through the detector and consequently does not correspond to the magnitude of the followed component. An equally incorrect result is obtained, when the levels of various components are subject to changes, for instance due to variations in the feed voltage of the detector or due to a shift of the zero line as a result of the instability of the chromatograph itself. Though the composition of the mixture then corresponds to reality, the rigidly adjusted device, which follows but the levels of the fractions, signals that the required value has been exceeded or, alternatively, has not been reached.

The present invention aims to avoid the aforementioned shortcomings by providing a new method and an appropriate device for automatically signalling and monitoring the continuously evaluated chemical analyses under operating conditions.

According to the main feature of the new method the components of the analyzed sample are determined from a basic standard consisting of known components of a reference mixture, and recorded in a time-responsive storage member and in a maximum-responsive storage member in such a way, that a discrepancy in amplitude of the stored and analyzed components, respectively, yields a signal serving for the control of the chemical process and a discrepancy as to time yields a command for an automatic check-up of the apparatus itself.

The device for carrying out the method of automatically signalling the followed and evaluated chemical analyses under service conditions according to the present invention comprises substantially a time-responsive storage (memory) member and a maximum-responsive storage (memory) member, said time-responsive member recording the time intervals from the beginning of the analysis up to the maximum of the followed components, while the maximum-responsive storage member is constituted by a selector connected into a Wheatstone bridge.

The device according to the invention operates as follows:

The apparatus is used in a production plant, where it is known what the composition of the watched mixture should be like at any given stage of the chemical process. A sample having exactly the same composition as the desired mixture is prepared in advance and is placed in a container forming part of the apparatus. When the apparatus is set in operation, the sample is first analyzed; it adjusts the parameters of the signalling device in such a manner that by the arrival in the apparatus of the various components the apparatus is set to record the time delay when the device has to follow the levels of elution curves, while simultaneously recording the heights of curves which correspond to the said components. Thereafter the apparatus being switched over to tap off the followed mixture carries out analyses and emits signals indicating the height of curves, said signals serving for the control of the process. The conformity in levels of the sample and the followed mixture, respectively, is checked exactly at the moment when the curve reaches its maximum. If the respective maxima are not in agreement, what happens upon a change in the working parameters of the chromatograph, the device interrupts the checking of the analysis and returns to its initial position by cancelling all recorded data; thereupon it again discharges a standard sample from the container, said sample adjusting the apparatus to follow the time and levels in such a way as corresponds to the changed conditions of the chromatograph. Thereafter a faultless analysis of the followed mixture is again made possible. Thus all inaccuracies can be eliminated that are caused by the instability of the chromatograph and the apparatus can operate reliably without attendance for a long time.

It is further an important advantage of the apparatus according to the invention that it may be used wherever voltages, variable as to time, are recorded by a registering device, such as in spectral analysis, measuring of temperatures, pressure and through-flow in chemical processes, watching the composition of flue gases in boiler plants, the atmosphere in mines, the composition of sewage gases and the like. It is evident that the new apparatus may be used for a great variety of purposes. It has to be pointed out, that the measured values can always yield a signal for control purposes and when a reference sample is used, the error of the measuring instrument itself can be eliminated or reduced.

The said and other objects of our invention will be more fully understood from the following specification when read with the accompanying drawing.

Figure 1:
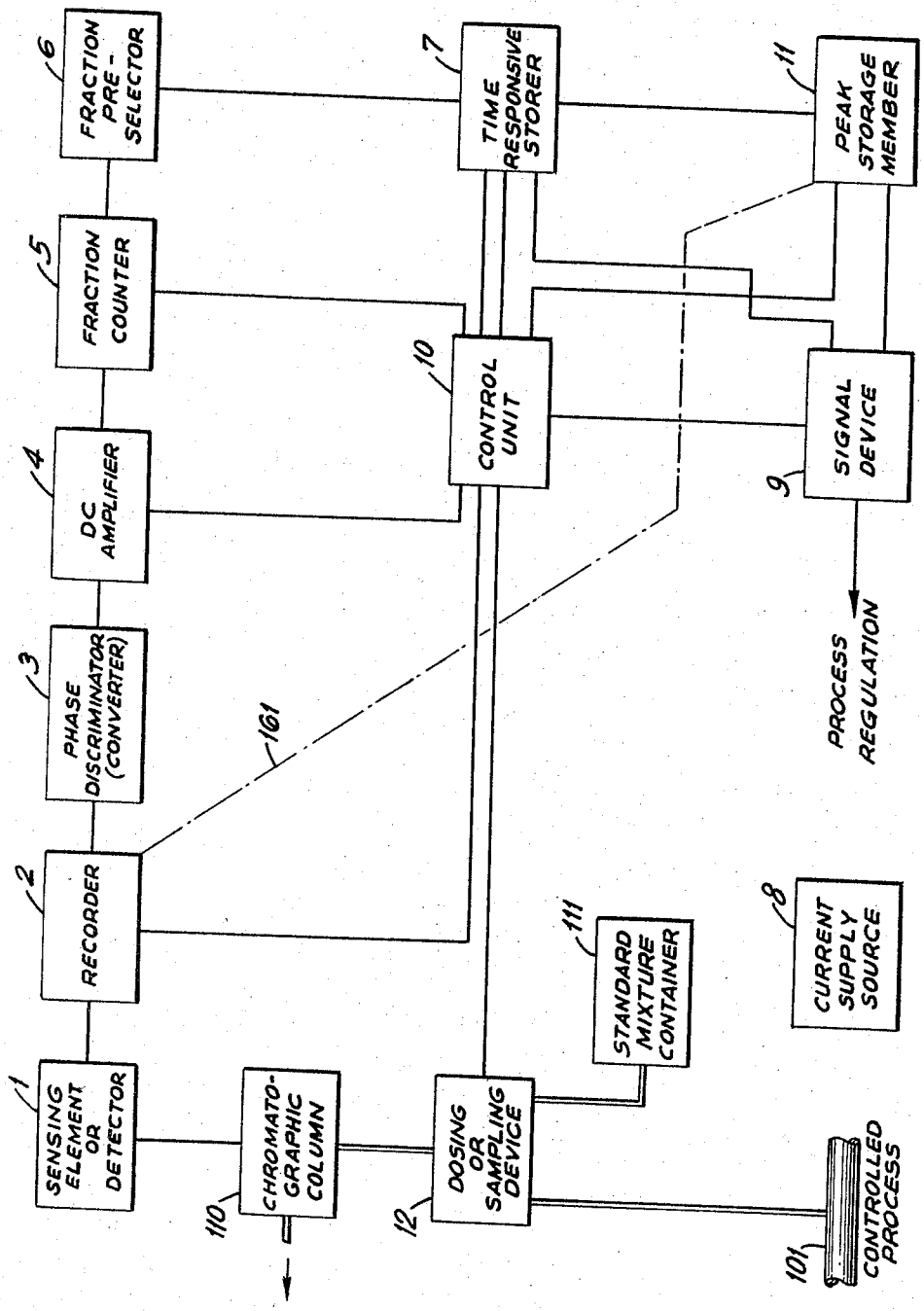
FIG. 1 is a block diagram of the overall array of the device in accordance with the invention.

Referring now more particularly to FIG. 1, block 1 denotes a sensing element or detector which is responsive to changes and values of some physical parameters of the sample by a voltage produced at its output. This detector is the source of the signal for the recording device 2, for example a sensing element of the gas chromatograph, of the spectograph or the like. Block 3 identifies a circuit arrangement which converts the passage of the phase of an alternating voltage through zero into a polarity variation of a direct voltage; this circuit arrangement will be referred to as phase discriminator 3. In combination with the compensation recording device 2 the phase discriminator 3 represents within certain limits a derivation device for extreme values of slow processes. Block 4 indicates a D.C. amplifier which is used to amplify the D.C. output voltage for exciting control relay 17 of FIG. 2. Block 5 identifies a counting circuit for counting the number of successive pulses, or the number of pulses contained in the pulse train produced by control relay 17, and this counting device will be referred to as fraction counter. Block member 6 is used for pre-selection of the peaks suitable for recording and regulation of the process, and it will be referred to as fraction pre-selector. Block 7 indicates the time responsive storage member or storer which is suitable for storing the time which has elapsed from the beginning of the analysis until appearance of a pre-selected peak. The indication of the respective peak value is stored in a peak or maximum storage member 11 which is mechanically coupled with the recording device 2. The operation of the device is controlled either manually or automatically from an actuating and control unit 10. All states of the various functions are signalled in the signal device 9 which also supplies signals for process control. Block 8 indicates the current supply source of the device.

Be it assumed that it is intended to control or supervise and to regulate a chemical process. Samples are withdrawn in selected intervals of the production process and they are analysed in a chromatographic column 110. The results of this analysis serve for regulation of the production process in all or only in some selected parameters.

It is known that the chromatographic analysis results in a curve which comprises several peaks in dependence on the time elapsed from the moment at which the sample has been dosed, the said peaks corresponding to the components of the analysed mixture. The time distance of a peak from the beginning of the analysis corresponds to a certain component, the height of the peak corresponds to its amount in the sample of the analysed mixture.

Some components of the mixture are important for the control and regulation of the production process of the mixture, while other components may be unimportant. It would therefore be of no purpose and be only irritating to watch also these unimportant components during the analysis, and to crowd the storage member of the device with useless dots. It is therefore necessary to permit a pre-selection for further supervision of those components only which have a decisive importance in the production of a desired mixture. To allow full automatic operation of the device it should even be possible to take into account the variations in the state of the chromatograph, that is its properties produced for example by deviations in the rate of flow of the carrier gas, in the temperature of the column, in the barometric pressure, and the like.

The equipment conforming to FIG. 1 meets all said requirements.

When the chromatograph is ready for an analysis, a pulse from the actuating and control unit 10 causes a sample of a standard mixture contained in a supply vessel or reservoir to be placed into the chromatographic column 110 by means of the dosing device 12. At the same time, in the recording device 2 whose input terminals are temporarily short-circuited, the beginning of the analysis is also recorded by a zero point, and the time responsive storage member 7 is operated. It should be emphasized at this point that the recording paper strip in the recording device is not moved during the analysis.

Across the sensing element 1 appears a voltage which varies in the course of the proceeding analysis and which signals the individual components of the standard mixture by successive peaks. The measuring part of the recording device 2 responds to variations in the signal from the sensing element 1 by automatic readjustment of the writing device and of the compensation potentiometer 14 in FIG. 2 by means of a built-in induction motor 16. The voltage of the auxiliary phase of this motor whose phase depends on the increase or decrease of the signal of the sensing element 1, is led into the phase discriminator stage 3 which converts the passage of the phase through zero value into a pulse which is amplified by current amplification in the direct current amplifier 4 of the control relay 17 in FIG. 2. This always occurs at the moment when the voltage of the sensing element 1 has just reached a peak corresponding to a component of the standard mixture. Such a pulse is produced with each peak and it actuates the fraction counter 5 which connects in a step-by-step manner the path of this pulse to the various positions of the fraction pre-selector 6. The order number of the fraction of the analysed mixture to be supervised is pre-adjusted in this pre-selector 6. In this manner it is achieved that only those pulses can pass through which belong to the fractions of the analysed mixture which are to be supervised.

The selected pulses reach the time responsive storage member 7 wherein the time period from the beginning of the analysis during which the fraction reaches the sensing element 1 is stored.

The selected pulse actuates also in the peak storage member 11 the storage of the information regarding the height of the peak of the supervised fraction.

The selected pulse effects also by means of the actuating and control unit 10 the recordation of the value of the peak on the recording paper of the recording device 2 by printing thereupon a dot. The dots of the values of the peaks of the supervised individual fractions may be distinguished by different colours.

After completion of the entire analysis of the standard sample, there is obtained in one line of the recording paper a record of the zero point and of all values of the peaks of the supervised fractions of the standard mixture, and in the time responsive storage member 7 and in the peaks storage member 11 the values of these parameters of the supervised fractions of the standard mixture are stored.

The actuating and control unit 10 causes now by means of an output pulse from the time responsive storage member 7 a short-circuit between the inout terminals of the recording device 2, feeding of the recording paper strip in the recording device by one line (several millimeters), and restoring of the fraction counter 5 and of the time responsive storage member 7 into the starting position.

The equipment is now ready to supervise and to regulate the production process by analysis of its operational samples. This is carried out by comparing the time and peak values of the operational samples with the same values of the standard samples.

Everything proceeds now in a similar manner as described with respect to the analysis of the standard sample. Of course, a command from the actuating and control unit 10 now causes the dosing device 12 to place into the chromatographic column an operational sample instead of the standard sample.

The times and values of the peaks of the supervised fraction do no longer cause adjustment of the storage members 7 and 11. But they are compared against the stored nominal values, the actual value of the peak being recorded. The times at which the peaks of the supervised fractions should appear, remain unchanged as long as the device works under constant conditions. The operational sample analyses are therefore repeated periodically one after the other if the difference of time of appearance of the peak remains constant within the limits of the discriminating power of the device. The differences in the values of the peaks serve to regulate the process by adjusated signals supplied by the device.

However, a different thing happens if a fraction does not appear at a time which corresponds to the stored nominal value. This characterizes some change in the properties of the chromatographic column and the device must be again "calibrated." In such case the actuating and control unit 10 issues a command to cancel the faulty analysis, it short-circuits the input terminals of the recording device 2 and it abolishes the stored values in the storage members 7 and 11. As soon as the last operational sample has left the chromatographic column, the actuating and storage unit 10 adjusts automatically a new analysis of a sample of the standard mixture. After new storage of the values of the time and of the height of the supervised peaks, there is a new automatic comparison between operational samples and the stored values of the standard mixture, and the process is again under control and regulated.

Figure 2:
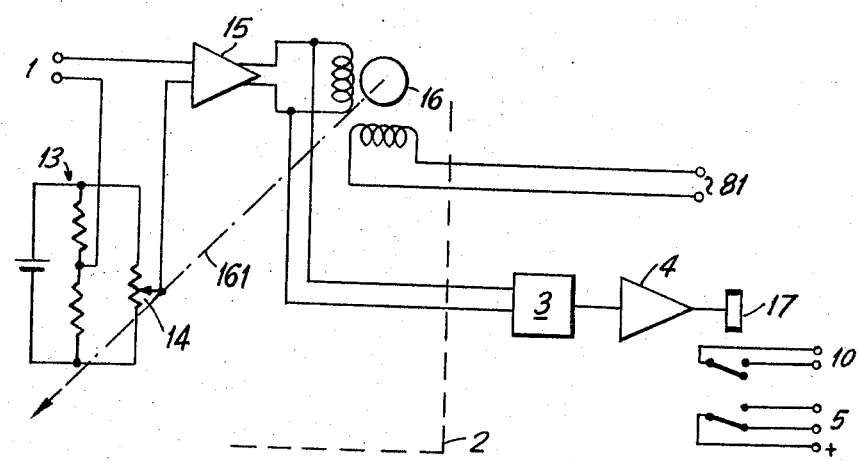
FIG. 2 shows schematically the recording device for obtaining a pulse at the moment at which the measured value reaches its peak value.

FIG. 2 shows the circuit diagram of the recording device 2 whose input is connected with the sensing element 1. Across the input of amplifier 15 is in series with the input voltage the voltage of a Wheatstone bridge 13 with potentiometer 14 whose slide contact is adjusted at the same time as the slide contact of the potentiometer 24 in the peak storage member 11, shown in FIG. 4, and as the writing member of the recording device 2 by means of a two-phase reversible induction motor 16. The main winding of the motor 16 receives the voltage from the current supply source 8. The amplifier 15 is an A.C. current amplifier with a splitter interceptor synchronized by the mains arranged in the input. Its output stage is illustrated more detailed in FIG. 3. The relay 17 is the above mentioned control relay.

Figure 3:
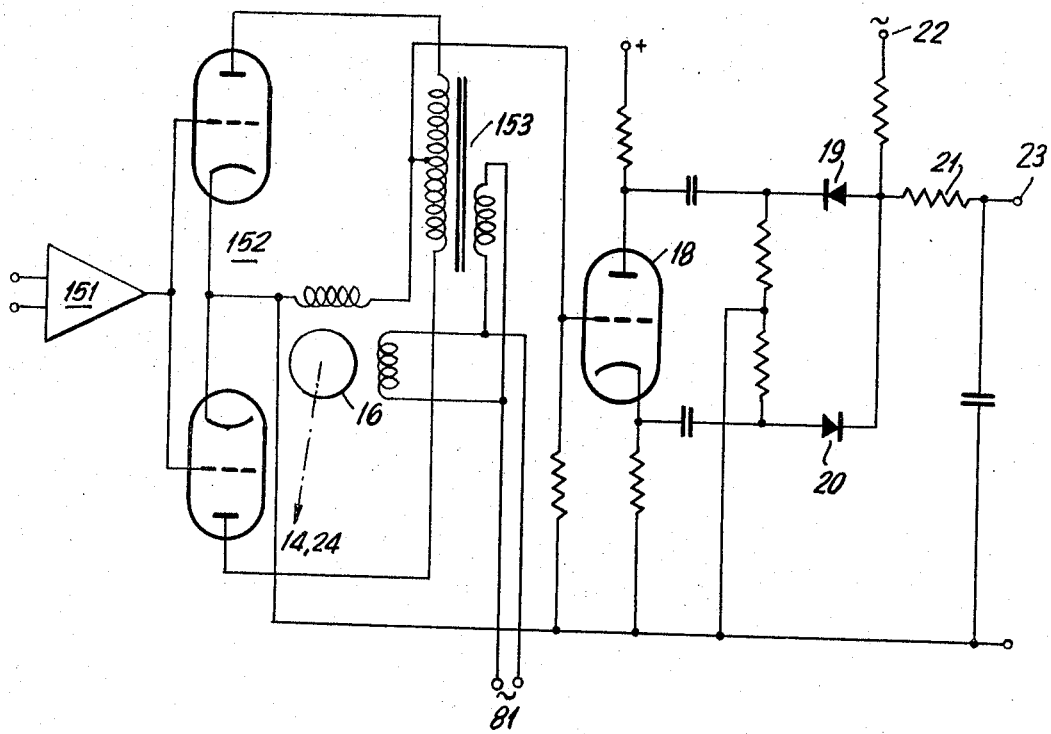
FIG. 3 shows diagrammatically a circuit capable to produce a voltage pulse from the phase change as the latter passes through zero.

Referring now to FIG. 3, in addition to FIGS. 1 and 2, 151 denotes the amplifier with a splitter synchronized by the mains, 152 denotes a controlled full-wave rectifier of the alternating voltage of the mains transformer 153. This stage feeds the auxiliary winding of the induction motor 16 whose phase depends on the polarity of the voltage across the input of the amplifier 15. A change in the polarity of the voltage across the input of amplifier 15 causes in the auxiliary winding of the induction motor 16 a change in the phase of the alternating voltage by 180°. At the moment when a peak of the voltage of the sensing element 1 occurs, the input voltage of the amplifier 15 and the phase position of its output voltage equal zero. The voltage of the auxiliary phase with the variable phase position is supplied to the phase discriminator stage 3 which consists principally of phase inverter stage 18, two diodes 19 and 20 and a resistor 21. The diodes 19 and 20 are supplied with an alternating voltage of constant phase (mains voltage) by means of the terminal 22 so that the diodes 19, 20 are alternately opened and closed. An alternating voltage is produced on the output terminal 23, the said alternating voltage containing a direct voltage component which is roughly proportional to the phase difference between the alternating voltages on the grid of phase reversal stage 18 and on the terminal 22.

The direct voltage component is strongly amplified in the direct current amplifier 4. The output tube in the anode current circuit thereof is connected to the control relay 17 and is biased in such a manner that in the case of zero input voltage the tube is almost cut-off. The relay 17 is therefore prevented from being operated. The circuit arrangement is so designed that as long the voltage on the sensing element 1 increases, there appears a negative voltage across the output of the phase discriminator stage 3 which drives the tube still more into the cut-off region. At the maximum point of the curve, the direction of the movement of the writing member of the recording device 2 is changed; the voltage on the grid of the output tube of the amplifier 4 changes its polarity too. The output tube becomes conductive, the control relay 17 is operated and remains approximately excited until the next maximum begins.

Figure 4:
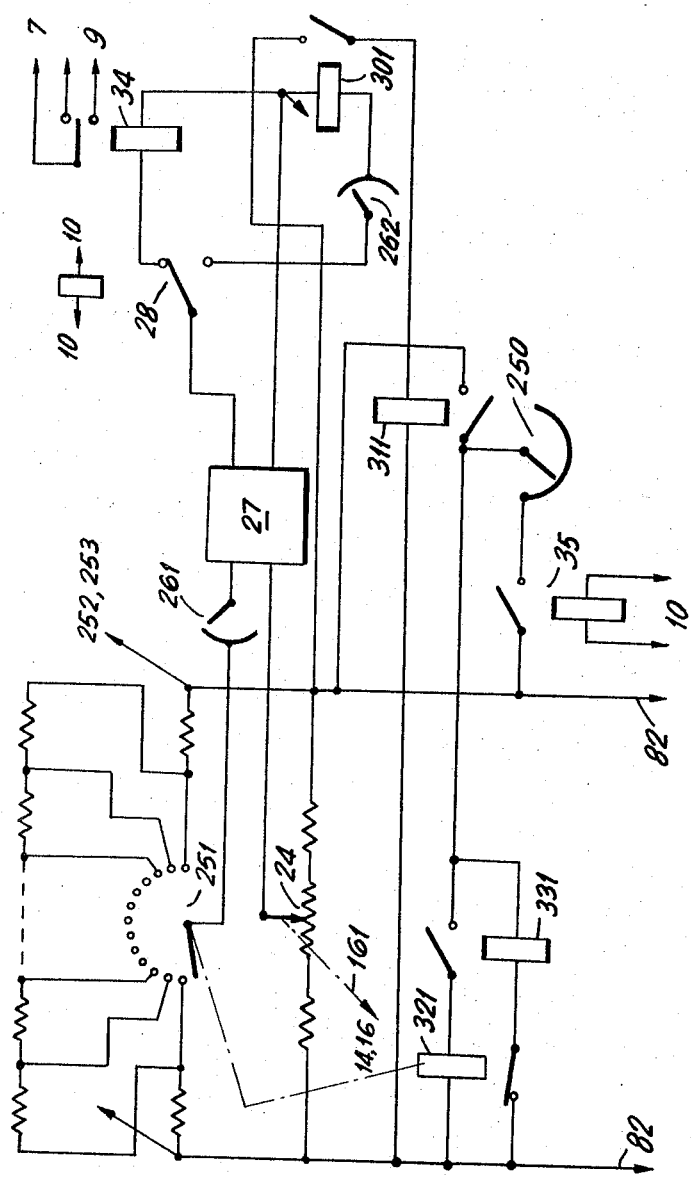
FIG. 4 is the circuit diagram of an electromechanic storage member for peak values.

The peak storage member 11 will be explained with reference to FIG. 4. The slide contact of potentiometer 24 is actuated mechanically by the mechanism for adjusting the writing member of the recording device 2, and it is therefore actuated together with the potentiometer 14, for example by means of a common shaft 161. The position on the slide contact of potentiometer 24 corresponds therefore always to the position of the writing member of the recording device 2, and hence also to the value of the signal of the sensing element 1. In parallel arrangement with the potentiometer 24 is a storage potentiometer 251 and other non-illustrated storage potentiometers 252, 253, and so forth. The number of such storage potentiometers 251 and so forth determines the number of fractions which can be supervised. The storage potentiometers 251, 252, and so forth, may be designed for example as telephone selectors with resistors between the contacts of the segment. Each of these selectors possesses a full segment 250 which serves for restoring the starting position. The step-by-step movement of each selector is secured by means of a magnet 321 cooperating with each selector and an interruption relay 331 with the relevant contacts. The slide contacts of the storage potentiometers 251, 252, and so forth, are connected with the contacts of a segment 261 of another selector of the fraction selector. The contact arm of this segment 261 is controlled by the control pulses of the preceding fractions and it connects step-by-step the slide contacts of the storage potentiometers 251 and so forth, one after the other, to one terminal of the difference amplifier 27 to whose other input terminal is permanently connected to the other slide contact of the potentiometer 24. The output of the difference amplifier 27 is led to the highly sensitive (polarized) relay 301 and so forth, each of which is associated with one storage potentiometer. The said output is led to the said relay 301 through the switchover contact of relay 28 and through the contact arm of the segment 262 of selector 26. The contacts of the said relay 301 make the exciting circuit of the respective amplifier relay 311 and so forth, which control the moving member 321, 331 of the storage potentiometer. The second contact of relay 28 connects a polarized relay 34 directly with the output of the difference amplifier 27. The contacts of this polarized relay 34 serve for transmission of the control pulses for operational control of the supervised process.

At the beginning of an analysis of the standard mixture the recording device 2, and therefore also potentiometer 24 of the peak storage member stand at zero. All storage potentiometers 251 and so forth, and the fraction selector 261 and so on, are initially so positioned that the difference amplifier 27 is connected with the first storage potentiometer 251 and the respective relay group. The Wheatstone bridge consisting of potentiometer 24 and 251 and fed through the connections 82 is balanced, there is no voltage across the difference amplifier 27, the polarized relay is not excited.

Upon appearance of the first pre-selected fraction of the standard sample mixture (the effect of the preceding non-selected fractions is eliminated in a known manner by non-illustrated means), the balance of the Wheatstone bridge 24, 251 is disturbed by readjustment of the slide contact of potentiometer 24 so that a voltage difference appears across the input of amplifier 27. This voltage difference causes operation of the polarized relay 301 whereby the slide contact of the storage potentiometer 251 is moved into a position where the voltage difference across the input of the amplifier 27 is a maximum. Upon appearance of a peak, the supply is disconnected by the control pulse and the fraction selector 26 is readjusted through one step to the second storage potentiometer 252 and its relay set. The value of the peak of the first preselected supervised fraction of the standard sample is stored by adjustment of the first storage potentiometer 251. The values of peaks of following supervised fractions are stored in a similar manner by the potentiometer 252 and so forth.

At the beginning of the analysis of the operational sample the polarized relay 34 is connected to the output of the difference amplifier 27 so that the moving members of the storage potentiometer 251 remain disconnected. During measurement of the maximum of the selected fraction, the position of the potentiometer 24 is compared against the stored position of the storage potentiometer. If the value of the peak of the operational sample equals the value of the standard sample, the voltage difference in the difference amplifier 27 is zero, the relay 34 is in its central position, none of its contacts is closed. The control pulse arriving from the control relay 17 through the time responsive storage member 7 does not meet a closed path. However, if there is a difference between the positions of the two slide contacts, there is across the input of the difference amplifier 27 a voltage, and the polarized relay 34 is operated within the sense of the polarity and it will transmit the control pulse into one or the other of the control circuits 9 which initiate the operation of certain regulatory steps of the production process.

If the stored information is to be extinguished a voltage is supplied from the actuating and control unit 10 to the relay 35 so that the current circuits of the moving members of the storage potentiometers 251, 252 and so forth, are connected through the full segments, and the selectors occupy their initial position. The selector 26 is restored in a similar manner. Relay 26 is disconnected. Storage of new values of a standard sample may begin.

Figure 5:
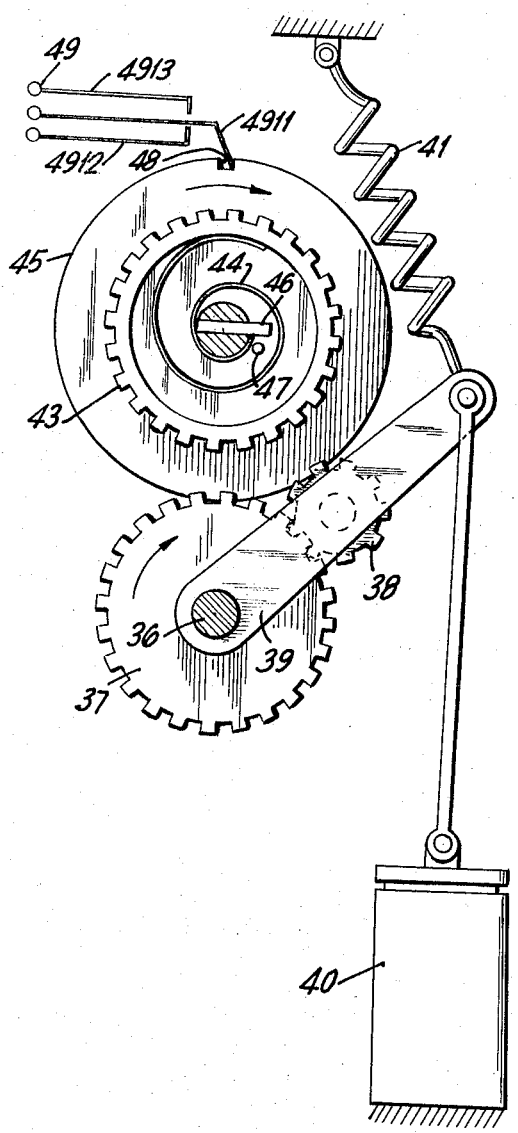
FIG. 5 illustrates the time responsive storage member.
Figure 6:
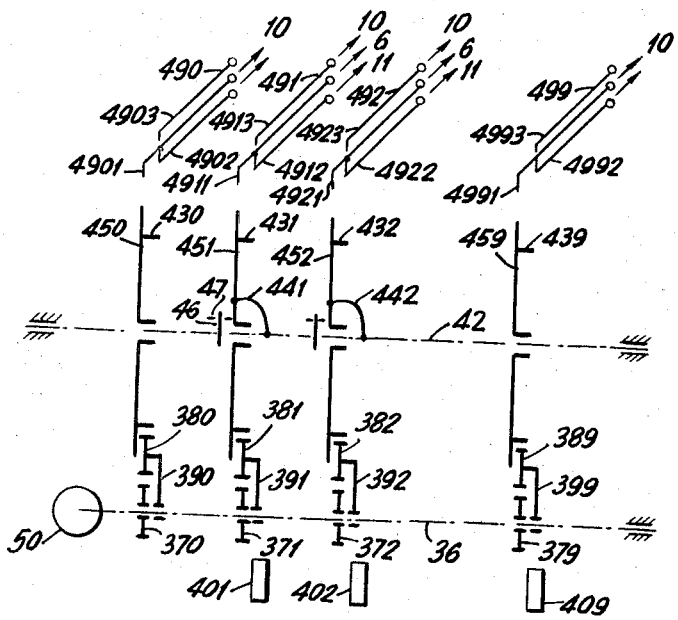
FIG. 6 illustrates an assembly of a required plurality of such storage members.

The time responsive storage member 7 may be designed in accordance with FIG. 5 and their multiple assembly arranged as schematically shown in FIG. 6. In the reference numerals used in these and other figures the first two digits of each numeral, for example 37 or 45, are used generally while the added third digits, as in 370, 371, 372 etc. or 450, 451, 452 etc., are used specifically to indicate one in a series of identical elements. Shaft 36 is driven by a synchronous motor 50 through a non-illustrated switchable gear. On the shaft 36 are mounted toothed wheels 370, 371, 372, and so forth, up to 379 which, by means of the toothed wheels 380, 381, 382, and so forth, up to 389, drive respectively the toothed wheels 430, 431, 432, and so forth, up to 439. The toothed wheels 430 to 439 carry each a disk 450 to 459, provided with a notch 48, and they are arranged rotatably on shaft 42, except for the toothed wheel 439 which is keyed-on on this shaft 42 in a fixed position. The rotatable wheels carry a stop pin 47 which in rest position abuts against the stop member 46 with the exception of the wheel 430 all rotatable wheels 431 and so forth, are held in their rest position by a spring 44 (441, 442, and so forth). In the rest position, the notches 48 of the disks 450 to 459 are located just below the ends of the switching over springs 4901, 4911, 4921 and so forth to 4991 of the supervision spring assembly 490, 491, 492 and so forth up to 499. In the rest position of the supervision spring assemblies 451, 452 and so forth, the springs 4911, 4921 and so forth, are in contact with the springs 4912, 4922 and so forth, which are connected with the switch-over spring of the spring assembly of the polarized relay 34. In the rest position the springs 4911, and so forth, are lifted and they are in contact with the springs 4913, 4923 and so forth. These springs are connected with the actuating and control unit 10 (FIG. 1).

The toothed wheels 370, 380 and 430 are in permanent engagement. The wheels 381 to 389 are drawn into engagement by the respective springs 41, by means of forks 391 to 399 which are swingably mounted on the shaft 36; they can be removed from engagement by means of the magnets 401 to 409.

The disk 450 being the control disk performs one revolution during a predetermined time interval of the entire analysis of a sample. The time duration of one revolution is predetermined by the said adjustable gear which is adjusted manually by experience. The disk 459 is an auxiliary disk which is set into movement automatically for about 5% of the duration of an analysis of a standard sample before the termination thereof; it permits several revolutions of all disks connected with the shaft 42 by means of springs 44, and it secures that all disks are restored into the initial position if the stored information is extinguished. The individual disks 451, 452 and so forth, whose number equals the highest possible number of the supervised fractions, serve for storing the time information of the occurrence of the peaks of the supervised fractions of the standard sample from the moment at which the analysis begins, and for comparing the time information with the times of the selected peaks of the subsequent analysis of the operational peaks.

The time responsive storage member operates in the following manner: With the beginning of the analysis of the standard sample, after a control command from the actuating and control unit 10, the synchronous motor 50 is set into movement and it rotates the control disk 450 so that its notch 48 leaves the initial position which readjusts the position of the spring assembly 490. All other disks are stationary due to the fact that they are braked in any known manner, and the toothed wheels 381 to 389 are thrown out of engagement by the magnets 401 to 409. If the control pulse of the first supervised peak arrives, the magnet 401 is disconnected and the disk 451 is set into movement by the engaging wheels 371, 381, and 431. The angular measure between the notches of the control disk 450 and the storage disk 451 is proportional to the time from the beginning of the analysis until appearance of the peak of the preselected fraction and it remains unchanged as long as the magnet 401 does not release the toothed wheel 431. In a similar manner are stored the times of the other selected peaks on the remaining disks 452, 453 and so forth. At approximately 5% of the duration of the analysis before its termination, the notch 48 of the control disk is brought into a position below the non-illustrated spring assembly whose readjustment actuates the magnet 409, and consequently sets into rotation the auxiliary disk 459 and with it also the shaft 42. This causes all toothed wheels to be in engagement, the storage disks to be at a fixed angular ratio, and the whole system may perform any number of revolutions without danger of breakage of the springs 44. After the control disk 450 has completed a revolution, the synchronous motor 50 is stopped, and it is again switched on only after dosing of the first operational sample; this takes place after termination of all analyses of the samples.

The time responsive storage member is restored into the initial position if there occurs no peak in the stored time. All storage disk magnets are operated so that the storage disks are released and pulled into the initial position of the stops 46, 47. The control disk 450 and the auxiliary disk 459 continue running. At the moment at which the notch 48 of the auxiliary disk rearranges the position of the spring assembly 499, the magnet 409 is operated, and all storage disks 451 and so forth, and the auxiliary disk are in initial position. The notch 48 of the control disk 450 is now underneath the spring assembly 490 which stops the synchronous motor 50. The actuating and control unit 10 is supplied with a signal indicating that the time responsive member 7 is again prepared for storing the times of a new standard sample.

Figure 7:
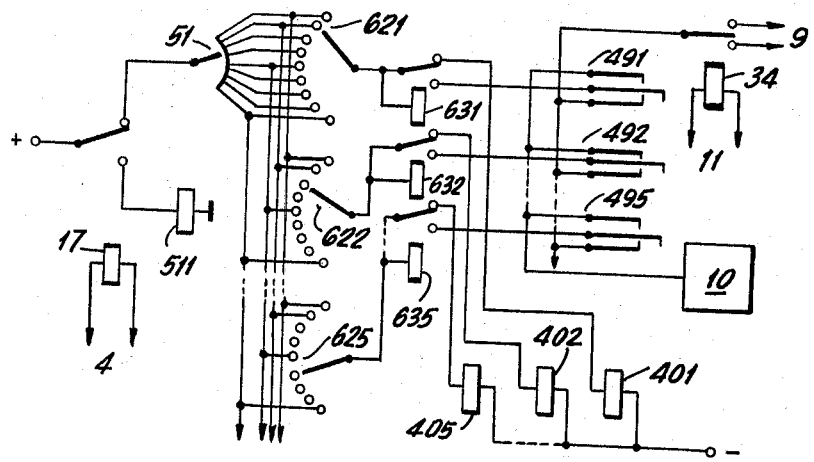
FIG. 7 is a simplified diagram of the electric circuits for counting successive peaks for pre-selection of the peaks used for the process regulation, for control of the time responsive storage member and of the entire equipment, and of the production of the control pulses for controlling the process.

FIG. 7 illustrates the paths of the pulses in a very simplified manner. For a better survey the auxiliary circuits have been omitted. The control relay 17 supplies at the beginning of each fraction a pulse to the movement magnet 511 of the 11-stage selector 51 which counts the fractions by its steps. The outputs of this selector 51 are connected in multiplex to the contacts of the manually adjustable switches 621, 622, and so forth. The number of these pre-selection switches equals the number of the highest possible supervisable fractions, and it agrees with the number of the storage potentiometers 251, 252, and so forth, in the peak storage member 11 and as well as of the storage disks 451, 452, and so forth, in the time responsive storage member 7. The outputs of the pre-selection switches 621, 622, etc., lead to the relays 631, 632, etc., without actuating disconnection of the magnets 401, 402, etc., in the time responsive storage member 7, and they switch over the path of the control pulses to the spring assemblies 491, 492, etc. of the same member. The polarized relay 34 is in the peak storage member 11.

The pre-selection switches 621, etc. are manually adjusted to the order numbers of the supervised fractions of the produced mixture so that the further path is prepared only for the control pulses of the selected peaks of the components of the analysed samples, while the control pulses of the peaks of all components which are not supervised cannot be produced.

Upon appearance of any peak the control relay 17 is operated and it supplies the moving magnet 511 of the counting selector with a pulse which causes the selector 51 to be moved always by one step at the beginning of a fraction. Each step corresponds to a fraction which may thus be counted. At the moment of a peak the control relay gives the plus pole through the counting selector 51 to the respective contact of all preselector switches 621, 622, etc. If any of them is adjusted to this contact, the current circuit of one of the relays 631, 632 is made. This brings the respective magnet 401, 402, etc., into such a position that the respective time responsive storage disk is set into rotation; the spring assembly 491, 492, etc., is readjusted, and the path for the control pulse to the actuating and control unit 10 is prepared. After completion of the analysis of the standard sample, the selector 51 is brought into its starting position by a command from the actuating and control unit 10; the relays 631, 632, etc. are excited and the relevant magnets 401, 402, etc., remains without current.

In the subsequent analysis of the operational sample the fractions are again counted by the selector 51, and only the selected control pulses are led to the spring assemblies of the respective storage member 7. If the control pulse finds the respective spring assembly in its initial position in the notch 48, it finds the path to the control contacts free. But if it arrives too early or too late, the notch 48 is no longer underneath the spring assembly 49 whose position is thereby adjusted, and the control pulse reaches the actuating and control unit 10 where it causes extinction of the stored values and resetting in accordance with the analysis of a new standard sample.

While specific examples of our new method and apparatus have been described and shown to illustrate the principles of our invention, it will be understood that the same may be otherwise embodied without departing from such principles.

What we claim as our invention is:

1. Method of regulating a chemical production process by automatic periodical withdrawal of operational samples, and by measuring two physical values of the result of the automatically accomplished analysis of the samples, which results in a curve having the character of a chromatogram or spectrogram, said method comprising the steps of
   (a) automatically withdrawing a standard sample in a preadjusted time and recording both the time interval between the start of the analysis and the moment a peaks appears in said curve as well as the value of such peak for predetermined fractions,
   (b) automatically withdrawing an operational sample, analyzing the same in the same manner as the standard sample, and comparing the timely occurrence and the value of the peak in the measuring curve of the selected component with the previously recorded equivalent values of the standard sample,
   (c) and using deviations in periodically repeated analyses of the operational samples of the values of the peaks to cause transmission of regulation commands, and further using deviations in the time of occurrence of the peaks to cause extinction of all recorded data in the timely occurrences and of the values of the peaks of selected components, automatically withdrawing the standard sample, and recording of the new values of the analysis of a standard sample in the respective storage members.

2. In a device of the type described for regulating a chemical production process by analysis in accordance with the method defined in claim 1, and including a sensing element responding by an electric voltage to some physical value of the result of the analysis of the sample; a recording compensation instrument measuring and recording the values of the voltage of the sensing element; a dosing device for automatic withdrawal and dosing of samples for the analysis; a phase discriminator forming together with the control part of the recording instrument a derivation circuit deriving from a change of the sign of the phase of the voltage of the control part of the recording instrument a D.C. pulse; a D.C. amplifier for amplifying this pulse and feeding a control relay; counters of the components of the analysed mixture; selectors of the supervised components; a member for recording the time of occurrence of the peak of at least one supervised component from the beginning of the analysis; a member mechanically coupled with said recording compensation instrument for recording the value of the peak of at least one supervised component; means for transmitting the value of the peak into the said member for recording the value of the peak; the improvement consisting therein that the same member for recording the time of occurrence of the peaks of selected components of the mixture comprises a time disk with a notch for each supervised selected component of the mixture, said disk being provided with a toothed wheel and a stop; the toothed wheel together with the time disk being freely rotatable on a common shaft of the time disks and drawn, by means of a spring, towards a stop; and further comprising a driving gear mounted in a swingable fork rotatable around the drive shaft and drawn into engagement by a spring, and removed from engagement by an electromagnet, the notch of the time disk being in the inital position underneath the end of the change-over spring of a supervising spring assembly.

3. In a device of the type described for regulating a chemical production process by analysis in accordance with the method defined in claim 1, and including a sensing element responding by an electric voltage to some physical value of the result of the analysis of the sample; a recording compensation instrument measuring and recording the values of the voltage of the sensing element; a dosing device for automatic withdrawal and dosing of samples for the analysis; a phase discriminator forming together with the control part of the recording instrument a derivation circuit deriving from a change of the sign of the phase of the voltage of the control part of the recording instrument a D.C. pulse; a D.C. amplifier for amplifying this pulse and feeding a control relay; counters of the components of the analysed mixture; selectors of the supervised components; a member for recording the time of occurrence of the peak of at least one supervised component from the beginning of the analysis; a member mechanically coupled with said recording compensation instrument for recording the value of the peak of at least one supervised component; means for transmitting the value of the peak into the said member for recording the value of the peak; the improvement consisting therein that the said derivation circuit consists of a phase inverter and two oppositely poled diodes at the outputs of the former, their common lead-out being connected, on the one hand to a source of A.C. voltage of constant phase and of the same frequency as the A.C. voltage with a variable phase across the input of the inverter, on the other hand to the input of the said D.C. amplifier, and the input of the inverter being connected to the lead-in line of the auxiliary phase of the induction motor of the compensation recording device.

References Cited by the Examiner

UNITED STATES PATENTS 3,098,957  7/1963  Thompson et al. ____ 73—23.1 X

OTHER REFERENCES

Article: Gas Chromatography in Plant Streams by David Fuller in ISA Journal, November 1956, pages 440–444.

RICHARD C. QUEISSER, *Primary Examiner.*